Feb. 17, 1942.  T. JACKSON  2,273,202
ENGINE
Filed May 15, 1940  2 Sheets-Sheet 1
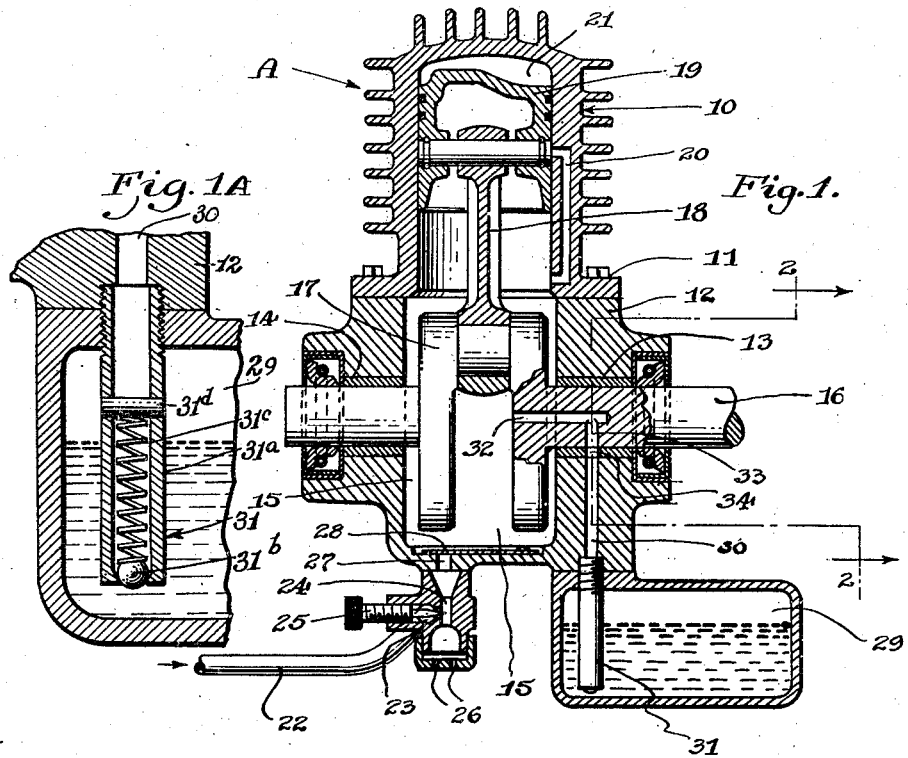
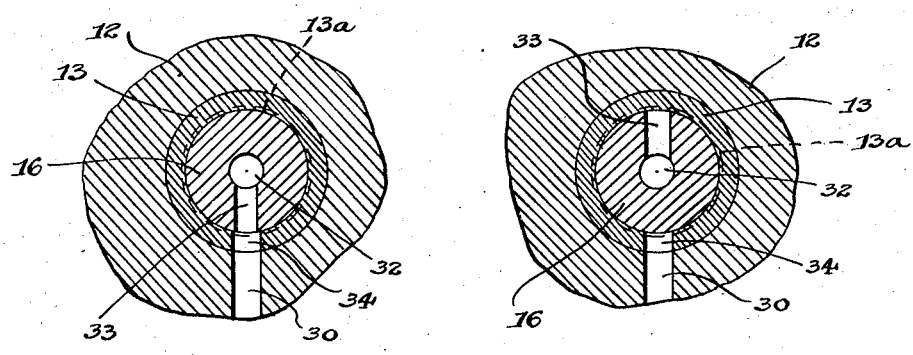
INVENTOR.
Thomas Jackson
BY
ATTORNEY.

Feb. 17, 1942.   T. JACKSON   2,273,202
ENGINE
Filed May 15, 1940   2 Sheets-Sheet 2
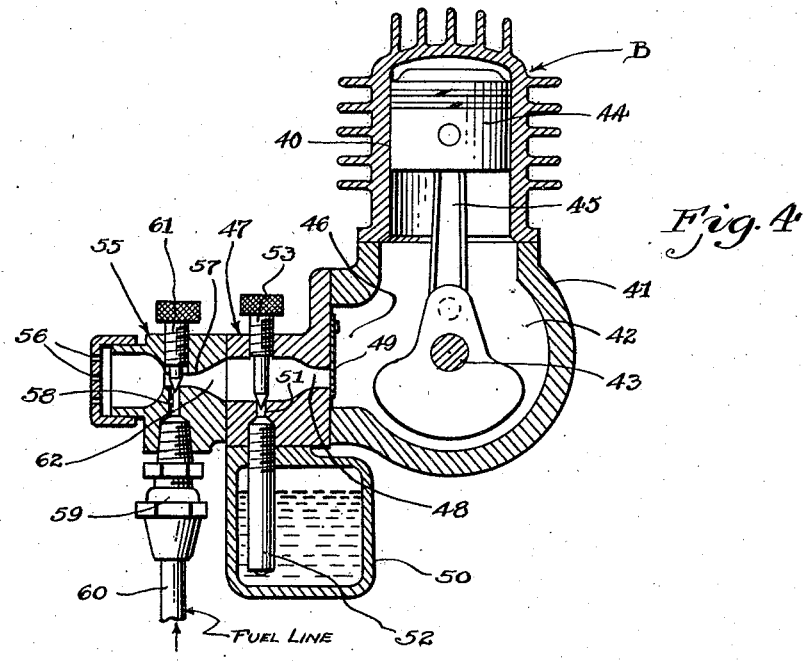
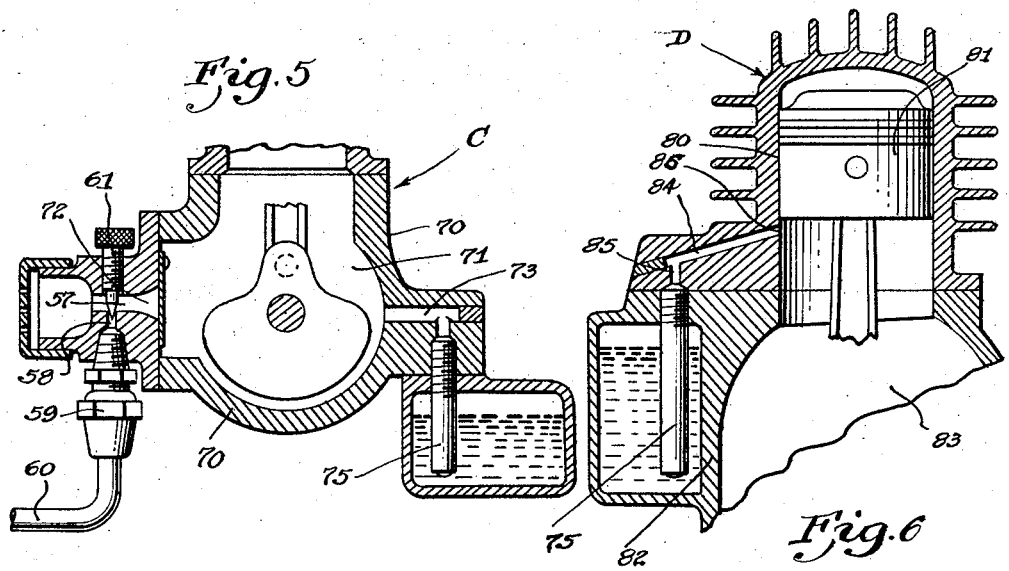
INVENTOR.
Thomas Jackson.
BY
ATTORNEY.

Patented Feb. 17, 1942

2,273,202

UNITED STATES PATENT OFFICE 2,273,202

ENGINE

Thomas Jackson, Kokomo, Ind., assignor to Continental Motors Corporation, Detroit, Mich., a corporation of Virginia Application May 15, 1940, Serial No. 335,361

16 Claims. (Cl. 123—73)

My invention relates to engines and more particularly to engines of the crankcase compression two-stroke cycle type.

In engines of the type aforesaid, much difficulty is experienced in the proper lubrication of engine parts due primarily to the absence of proper control means for regulating the amount of lubricating oil which is supplied to the engine. It is customary to mix lubricating oil with the fuel in the fuel tank and depend on the fuel carrying an adequate amount of lubricating oil into the crankcase where same is atomized, resulting in the lubricating oil being forced into the engine bearings and other parts to be lubricated when the charge of fuel and oil in the crankcase is compressed. The above method is not always satisfactory because the operator sometimes becomes careless and does not provide the proper amount of lubricating oil in the fuel tank and as a result the engine parts to be lubricated do not receive an adequate supply of lubricating oil. Furthermore, this customary method of lubricating the bearing parts of a two cycle engine results in an excessive consumption of lubricating oil as it is the practice to provide a large excess of lubricating oil in order to make sure that the lubricating oil is uniformly distributed throughout the fuel mixture charge so as to provide lubrication for any of the engine parts coming in contact with the said charge.

An object of my present invention is to eliminate the above mentioned difficulties in connection with the operation of a two-stroke cycle engine of the crankcase compression type by providing a construction for separately introducing fuel and lubricating oil to the engine.

Another object of the present invention is to construct an engine of the type aforesaid which can be more economically and efficiently operated by providing a separate means for introducing lubricating oil to the engine parts or bearings to be lubricated in such a way as to obtain a minimum uniform consumption of lubricating oil without the danger of bearing failure due to the lack of an adequate supply of lubricating oil.

A further object of my present invention is to construct an improved engine of the type aforesaid by providing an independent lubricating oil supply means for introducing lubricating oil directly to engine bearings and/or other parts thereof to be lubricated.

A still further object of the present invention is to construct an improved two-stroke cycle engine of the type aforesaid by providing separate fuel and lubricating supply means operable to supply lubricating oil to engine bearing parts and permitting the excess lubricating oil supplied thereto to be subsequently discharged into the engine crankcase where same intermingles with the fuel mixture in said crankcase to lubricate other moving parts of the engine and to be subsequently carried along with the fuel to the engine combustion chamber where same is burned along with the fuel in the usual manner.

A still further object of my present invention is to provide an improved two-stroke cycle engine of the crankcase compression type by providing separate fuel and lubricating oil supply means and including manually adjusted control devices for metering the amount of fuel and lubricating oil supplied to said engine crankcase.

A still further object of my invention is to improve engine performance by providing a separate means for supplying lubricating oil to the engine parts to be lubricated by reason of the suction pressure produced in the closed engine crankcase chamber.

For a more detailed understanding of my invention, reference may be had to the accompanying drawings illustrating a preferred embodiment of my invention in which like parts are referred to by like characters throughout the several views, and in which:

Fig. 1 is a vertical longitudinal sectional view through a two-stroke cycle internal combustion engine of the crankcase compression type and which embodies my invention, Fig. 1A is a detail sectional view of the check valve, Fig. 2 is a detail sectional view taken on the line 2—2 of Fig. 1, Fig. 3 is a detail sectional view similar to Fig. 2 and showing another position, Fig. 4 is a detail sectional view of a modified engine construction, Fig. 5 is a detail fragmentary sectional view of a modified construction, and Fig. 6 is a detail fragmentary sectional view of a still further modified construction.

Referring more particularly to Figs. 1 and 2, my improved engine structure is designated as a whole by reference character "A" and comprises a cylinder 10 bolted or otherwise secured as at 11 to a crankcase structure 12. The crankcase structure carries crankshaft bearings 13 and 14 and defines a closed crankcase chamber 15. A crankshaft 16 is rotatably supported by these crankshaft bearings 13 and 14 and is provided with the crank 17 to which is pivoted the conventional connecting rod 18 connecting the piston 19 to the crankshaft. The cylinder 18 is provided with the usual by-pass 20 for conducting the compressed fuel mixture from the closed crankcase to the interior of this engine cylinder 21.

My improved engine construction comprises separate fuel and lubricating oil supply means. The fuel line 22 leading from the fuel tank is connected with the carburetor inlet 23, which carburetor is provided with the usual venturi 24 and a manually adjustable needle valve 25, the air being admitted through suitable ports 26 in the carburetor unit. The above described fuel mixture and forming device connects with a passage 27 in the crankcase wall and has associated therewith a conventional check valve 28 which is operable to allow free flow of the air and fuel mixture into the crankcase under suction pressure in said crankcase chamber but which closes passage 27 during compression within said closed crankcase.

A suitable oil tank or reservoir 29 is bolted or otherwise secured to the engine crankcase structure and connects with a passage 30 in said crankcase which has associated therewith a conventional type check valve 31. More particularly this check valve comprises a pipe section 31a peened over at one end to support a ball 31b which is urged toward its seat by a suitable light spring 31c, the spring being seated against a pin or other suitable abutment 31d. The crankcase is provided with a passage 32 extending longitudinally of the crankshaft which communicates at all times with a radial passage 33 aligned in the plane of the passage 30. The bearing 13 is preferably provided with an annular spiral oil groove 13a and with a port 34 which registers with passage 30 and these passages 30 and 32 cooperate to periodically be moved into registration on rotation of the crankshaft so as to intermittently supply lubricating oil to bearing 13 and to the interior of the crankcase. It will be noted that the passage 33 is constructed and timed with relation to crankshaft rotation so as to register with passage 30 when suction pressure is introduced in said crankcase so as to induce the flow of lubricating oil through said passages in response to suction pressure in the engine closed crankcase. The diameter or size of these passages 30, 32 and 33 may be varied as desired for varying the amount of lubricating oil which is permitted to flow therethrough.

It will thus be noted that the crankshaft bearing 13 is supplied directly with a measured amount of lubricating oil and excess lubricating oil is subsequently discharged into the crankcase chamber 17. The above described construction insures positive lubrication of the main crankshaft bearing and the adequate supply of lubricating oil to the crankcase at all times for all other parts of the engine to be lubricated. It will be observed that under all conditions of engine operation, we are assured of a correct supply of carbureted fuel and lubricating oil whereby to insure satisfactory engine operation at all times. Furthermore, the above construction results in a minimum consumption of lubricating oil and provides for economical engine operation with a minimum of maintenance costs.

If desired lubricating oil may be directly conducted from passage or conduit 30 to other engine parts to be lubricated, the excess oil being allowed to pass into the crankcase where the oil can be used to lubricate other moving parts.

Referring to Fig. 4, the engine B includes a cylinder 40 and a crankcase 41 providing a closed crankcase chamber 42 in which a fuel mixture is introduced, compressed and then transferred to the engine combustion chamber in the usual way. The crankcase supports a crankshaft 43 which is connected with piston 44 by the usual connecting rod 45.

The crankcase is provided with a port 46 and secured to the crankcase is a unitary lubricating oil supply means 47 carrying a passage 48 opening into the crankcase chamber 42 and having associated therewith a check valve 49. The lubricating oil supply means includes an oil chamber or reservoir 50 and an oil duct 51 opening into the passage 48. A check valve 52 is preferably associated with the oil duct 51 and said structure preferably further supports a manually adjustable needle valve 53 which is operable to control the discharge of the lubricating oil into the passage 48 from the oil duct 51.

The needle valves permit ready manual adjustment of the fuel and oil discharge openings, but obviously the flow of fuel and oil may be varied by selectively varying the size of said discharge openings.

A carburetion device or structure 55 is preferably secured to the lubricating oil supply means 47 and is provided with a conventional air inlet 56, carburetor venturi 47 and fuel inlet 58 connected by a coupling 59 with a fuel supply line 60. A manually adjustable needle valve 61 is preferably supported by the carburetor casing to control the outlet of fuel passage 58.

It will be thus observed that as the carbureted fuel flows through the primary conducting portion 62, through passage 48 and into the crankcase chamber 42 in response to suction pressure within said crankcase chamber, that lubricating oil will be picked up by the fuel stream and taken into the crankcase where same is caused to flow to the various engine parts to be lubricated in the usual manner.

In Fig. 5 the crankcase 70 of engine C is constructed to provide a closed chamber 71. The carbureted fuel is admitted at 72 by means similar to that shown in Fig. 4, and the lubricating oil is introduced directly into the crankcase from an oil duct 73 which is openly connected to the crankcase so as to subject the oil supply to the suction pressure in the crankcase, and preferably a conventional ball check valve 75 is constructed to meter the incoming oil. Also the size of the oil discharge duct may be preferably selected so as to only feed the right amount of lubricating oil into the crankcase chamber in response to the suction pressure therein.

In Fig. 6, the engine D has a cylinder 80 in which piston 81 is operable, and a crankcase 82 providing a closed crankcase chamber 83. The oil supply line 84 is connected to the cylinder as at 85 and the oil discharge opening 86 is arranged to be uncovered by the piston skirt at or near the end of the suction stroke to place the oil supply in open communication with the suction pressure in said closed crankcase chamber. This provides a construction which separately admits oil to the crankcase chamber where same intermingles with the fuel mixture therein and is conducted to various parts of the engine to be lubricated.

In both of these constructions, as described above, it will be observed that I have provided means for separately supplying fuel and lubricating oil to the engine in response to suction pressure in the crankcase and this means is operable to insure at all times an adequate measured supply of lubricating oil for lubricating the engine bearings and other parts of the engine and thus obtain efficient lubrication with a minimum of oil consumption. The operation of an engine constructed in accordance with my invention may be economically operated and is absolutely free from lubricating difficulties, thus insuring continuous and reliable engine operation with a minimum of time lost for maintenance and servicing.

Although I have described some of the preferred constructions of my invention, it will be apparent to those skilled in the art to which my invention pertains, that various modifications and changes may be made therein without departing from the spirit of my invention or from the scope of the appended claims.

I claim:

1. In an internal combustion engine of the two-stroke cycle type, a closed crankcase, a crankshaft rotatable therein, an engine bearing, means for supplying a vaporized mixture of fuel and air to said crankcase, and separate means for supplying a lubricant to the engine bearing from a source of supply exteriorly of the engine crankcase, said fuel mixture and lubricant supply means operable in response to suction pressure within the crankcase.

2. In an internal combustion engine of the two stroke cycle type, a closed crankcase, a crankshaft rotatable therein, an engine bearing, means for supplying a vaporized mixture of fuel and air to said crankcase in which same is compressed and subsequently introduced into the engine cylinder and means supplying a measured amount of lubricating oil to said engine bearing from a source of supply exteriorly of the engine crankcase and in an amount in excess of the quantity to be used for lubricating the engine bearing, said surplus lubricating oil being subsequently discharged into the crankcase and thereby mixed with the fuel mixture.

3. In an internal combustion engine of the two-stroke cycle type, a closed crankcase, a crankshaft rotatable therein, an engine bearing, means for supplying a vaporized mixture of fuel and air to said crankcase in which same is compressed and subsequently introduced into the engine cylinder, and separate means operable in response to suction pressure in the crankcase for supplying a measured amount of lubricating oil to said engine bearing from a source supply exteriorly of the engine crankcase.

4. In an internal combustion engine of the two-stroke cycle type, a closed crankcase, a crankshaft rotatable therein, a crankshaft bearing, means for supplying a vaporized mixture of fuel and air to said crankcase in which same is compressed and subsequently introduced into the engine cylinder, and separate means for supplying a measured amount of lubricating oil to said crankshaft bearing and including an oil reservoir and cooperating passages connecting same with the crankshaft bearing and crankcase interior.

5. In an internal combustion engine of the two-stroke cycle type, a closed crankcase, a crankshaft rotatable therein, a crankshaft bearing, means for supplying a vaporized mixture of fuel and air to said crankcase in which same is compressed and subsequently introduced into the engine cylinder, and separate means for supplying a measured amount of lubricating oil to said crankshaft bearing and including an oil reservoir and cooperating passages connecting same with the crankshaft bearing and crankcase interior, said passages formed in the crankcase wall and crankshaft respectively and so constructed and arranged as to periodically place said oil reservoir in communication with the crankcase interior whereby to periodically cause the lubricating oil to flow to said crankshaft bearing.

6. In a crankcase compression two-stroke cycle engine, a closed crankcase, a crankshaft rotatable therein, a crankshaft bearing, means supplying a carbureted mixture of fuel and air to said crankcase, and separate means for introducing a lubricating oil to the crankshaft bearing and crankcase and including an oil reservoir exteriorly of said crankcase and connecting passages formed in said crankshaft and crankcase respectively cooperating to cause an intermittent flow of lubricating oil to said crankshaft bearing from said oil reservoir, said lubricating oil in excess of that used by the crankshaft bearing being introduced into the crankcase.

7. In a crankcase compression two-stroke cycle engine, a closed crankcase, a crankshaft rotatable therein, a crankshaft bearing, means supplying a carbureted mixture of fuel and air to said crankcase, and separate means for introducing a lubricating oil to the crankshaft bearing and crankcase and including passages formed in said crankshaft and crankcase respectively cooperating to cause an intermittent flow of lubricating oil direct to said crankshaft bearing and constructed and arranged to subsequently conduct excess lubricating oil from said crankshaft bearing to said crankcase.

8. In a crankcase compression two-stroke cycle engine having a cylinder and a piston operable therein, a closed crankcase chamber, a crankshaft rotatable therein, means supplying a carbureted mixture of fuel and air to said crankcase, and separate means for introducing a lubricating oil to the carbureted mixture of fuel and air in said crankcase chamber only during the time said crankcase is being subjected to suction pressure by reason of the travel of the piston outwardly of the engine cylinder.

9. In a crankcase compression two-stroke cycle engine, a closed crankcase, a crankshaft rotatable therein, a crankshaft bearing, an air passage connected with said crankcase, a check valve associated with said air passage, means supplying a carbureted fuel to said air passage, and lubricating oil inlet means intermediate said fuel inlet and said check valve.

10. In a crankcase compression two-stroke cycle engine, a closed crankcase, a crankshaft rotatable therein, a crankshaft bearing, an air passage connected with said crankcase, a check valve associated with said air passage, means supplying a carbureted fuel to said air passage, and metered lubricating oil inlet means intermediate said fuel inlet and said check valve.

11. In a crankcase compression two-stroke cycle engine, a closed crankcase, a unitary lubricating oil supply means secured to said crankcase and having a passage opening into said crankcase, a check valve at the junction of said passage and crankcase, and a unitary fuel mixing and forming device secured to said lubricating oil supply means and having a primary conducting passage arranged in open communication with the passage in said lubricating oil supply means.

12. In a crankcase compression two-stroke cycle engine, a closed crankcase, a unitary lubricating oil supply means secured to said crankcase and having a passage opening into said crankcase, a check valve at the junction of said passage and crankcase, and a unitary fuel mixing and forming device secured to said lubricating oil supply means and having a primary conducting passage arranged in open communication with the passage in said lubricating oil supply means, said oil supply means and said fuel mixing and forming device each provided with a manually adjustable valve for independently controlling the fuel and oil supply means respectively.

13. In a crankcase compression two-stroke cycle engine, a cylinder, a piston operable in said cylinder, a crankcase structure providing a closed crankcase chamber, means supplying a carbureted fuel to the crankcase chamber, and separate oil supply means including an oil discharge port opening in said cylinder and located relative to said piston to be uncovered by said piston substantially near the end of the engine suction stroke, whereby to induce oil flow in the crankcase chamber in response to the suction pressure therein.

14. In a two-stroke cycle engine having a closed crankcase chamber and one or more engine bearings and other parts to be lubricated, fuel supply means operable to supply fuel to the engine, and separate lubricating oil supply means including an oil reservoir and connecting passages operable in response to the suction pressure in said crankcase chamber to supply lubricating oil first to an engine bearing and thence to intermingle with the carbureted fuel mixture in the crankcase for lubricating other engine parts.

15. In a two-stroke cycle engine having a closed crankcase chamber and one or more engine bearings and other parts to be lubricated, fuel supply means operable to supply fuel to the engine, and separate lubricating oil supply means operable in response to the suction pressure in said crankcase chamber to supply lubricating oil to one or more of said engine bearings and other engine parts, said oil supply means including means measuring the oil supplied to said engine bearing and engine parts to be lubricated.

16. In a two-stroke cycle engine having a closed crankcase chamber, a crankshaft, a crankshaft bearing, means feeding a carbureted fuel mixture to said crankcase, a source of lubricant supply including a reservoir and an oil passage connected with said bearing, said passage being extended beyond the bearing and terminating in an outlet openly communicating with the crankcase chamber, means metering the flow of oil from said reservoir to said oil passage, and means operable to periodically open and close said oil passage, said means timed with engine operation to open said passage during a predetermined interval of time when said crankcase is being subjected to suction pressure.

THOMAS JACKSON.